(12) United States Patent
Wang et al.

(10) Patent No.: US 11,339,077 B2
(45) Date of Patent: May 24, 2022

(54) FINING GLASS USING HIGH TEMPERATURE AND LOW PRESSURE

(71) Applicant: Owens-Brockway Glass Container Inc., Perrysburg, OH (US)

(72) Inventors: Zhongming Wang, Ypsilanti, MI (US); Scott Weil, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 240 days.

(21) Appl. No.: 16/668,115

(22) Filed: Oct. 30, 2019

(65) Prior Publication Data

US 2021/0292209 A1    Sep. 23, 2021

(51) Int. Cl.
| | |
|---|---|
| *C03B 5/225* | (2006.01) |
| *C03B 5/02* | (2006.01) |
| *C03B 5/235* | (2006.01) |
| *C03B 5/26* | (2006.01) |

(52) U.S. Cl.
CPC .............. *C03B 5/2252* (2013.01); *C03B 5/02* (2013.01); *C03B 5/2356* (2013.01); *C03B 5/26* (2013.01); *C03B 2211/22* (2013.01)

(58) Field of Classification Search
None
See application file for complete search history.

(56) References Cited

U.S. PATENT DOCUMENTS

| | | | |
|---|---|---|---|
| 2,465,283 A | 3/1949 | Schlehr | |
| 2,485,851 A | 10/1949 | Stevens | |
| 3,244,495 A * | 4/1966 | Apple | C03B 5/021 65/161 |
| 4,780,121 A | 10/1988 | Matesa | |
| 4,780,122 A * | 10/1988 | Schwenninger | C03B 5/20 65/134.2 |
| 5,756,957 A | 5/1998 | Titus et al. | |
| 7,454,925 B2 | 11/2008 | DeAngelis et al. | |
| 8,661,852 B2 | 3/2014 | Leister et al. | |
| 8,695,378 B2 | 4/2014 | Thomas | |
| 9,776,904 B2 | 10/2017 | Gullinkala et al. | |
| 2004/0063057 A1 | 4/2004 | Vetter | |
| 2009/0277226 A1 | 11/2009 | Santangelo et al. | |
| 2012/0210751 A1 | 8/2012 | Rue et al. | |

(Continued)

FOREIGN PATENT DOCUMENTS

WO   2015187415 A1   12/2015

OTHER PUBLICATIONS

Int. Search Report and Written Opinion, Int. Serial No. PCT/US2020/057467, Int. Filing Date: Oct. 27, 2020, Applicant: Owens-Brockway Glass Container Inc., dated Jan. 28, 2021.

*Primary Examiner* — Lisa L Herring

(57) ABSTRACT

A glass fining system, glass fining device, and method are disclosed. The glass fining device in accordance with one aspect of the disclosure includes at least one heated orifice through which molten glass flows from a glass melter to produce at least one superheated glass stream; and a low-pressure chamber disposed downstream from the heated orifice, where the at least one superheated glass stream flows from the at least one heated orifice and into the low-pressure chamber, and where the low-pressure chamber surrounds the at least one superheated glass stream. In some embodiments, the low-pressure chamber may include at least one surface extender.

22 Claims, 4 Drawing Sheets

(56) References Cited

U.S. PATENT DOCUMENTS

| | | |
|---|---|---|
| 2015/0353405 A1* | 12/2015 | Gullinkala ............ C03B 5/2257 |
| | | 65/134.2 |
| 2016/0200618 A1 | 7/2016 | Boughton et al. |
| 2017/0057855 A1* | 3/2017 | Swiler ..................... C03B 5/187 |
| 2017/0240450 A1 | 8/2017 | Meng et al. |
| 2019/0152827 A1* | 5/2019 | Otter ..................... C03B 37/027 |
| 2019/0284078 A1* | 9/2019 | Wang ..................... C03B 5/262 |

\* cited by examiner

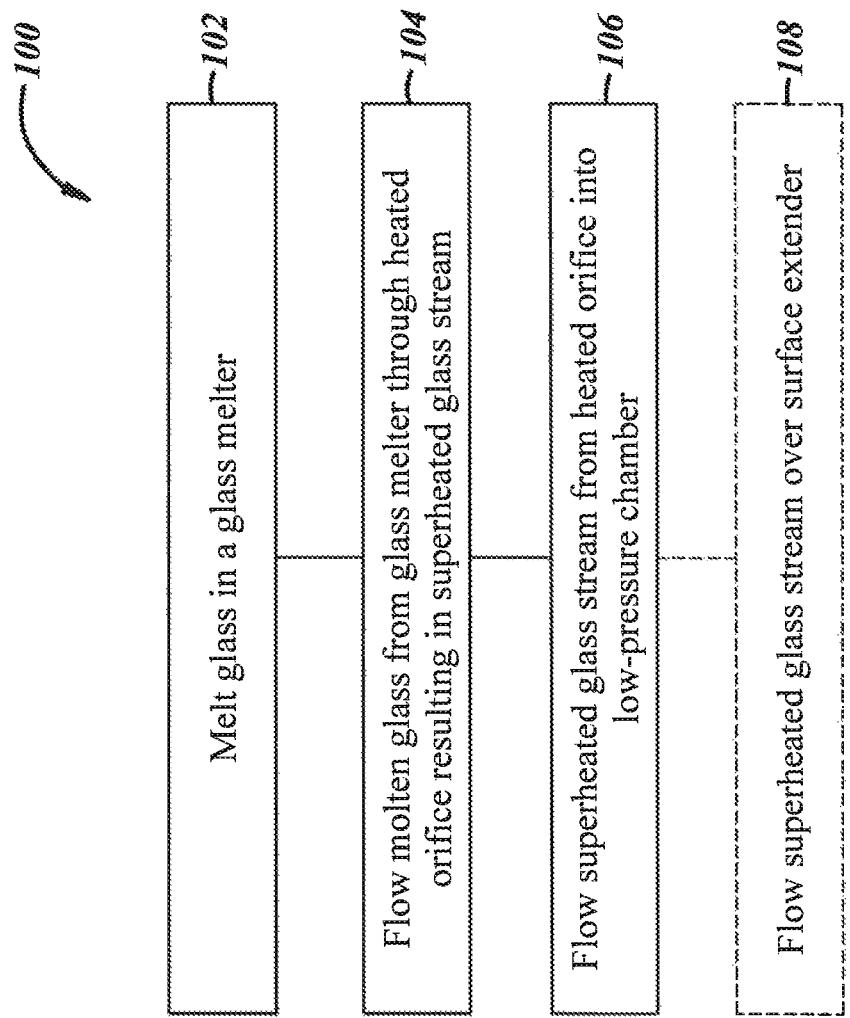
FIG. 10
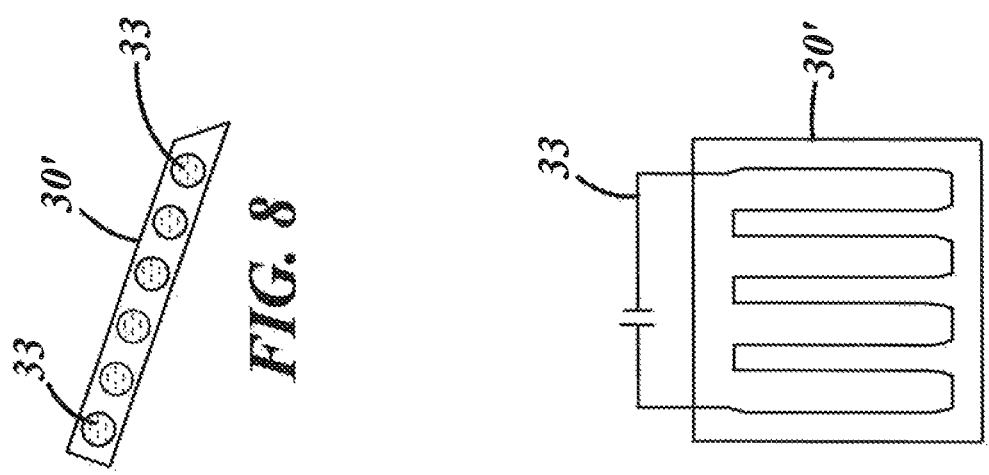
FIG. 8
FIG. 9

FINING GLASS USING HIGH TEMPERATURE AND LOW PRESSURE

The present disclosure is directed to devices for glass manufacturing, and more particularly, devices for fining molten glass.

BACKGROUND

Submerged combustion melting ("SCM") is based on enhancing heat transfer by mixing combustible fuels and oxidants with raw glass material and firing the fuels and oxidants directly into and under the surface of the glass material to be melted. The contact between the raw glass material and the combusting fuels and oxidants generates a bubbling bath of molten glass with high rates of mass and heat transfer. During this process, gases can be produced, which may evolve to form gas bubbles within the molten glass. The process of removing the gas bubbles from molten glass can be referred to as fining (it may also be referred to as refining). Fining can occur inside or outside of a furnace or tank, such as in downstream fining chambers.

BRIEF SUMMARY OF THE DISCLOSURE

The present disclosure embodies a number of aspects that can be implemented separately from or in combination with each other.

A glass fining device in accordance with one aspect of the disclosure includes at least one heated orifice through which molten glass flows from a glass melter to produce at least one superheated glass stream; and a low-pressure chamber disposed downstream from the heated orifice, where the at least one superheated glass stream flows from the at least one heated orifice and into the low-pressure chamber, and where the low-pressure chamber surrounds the at least one superheated glass stream.

A glass fining system in accordance with one aspect of the disclosure includes a glass melter and a glass fining device coupled to the glass melter, the glass fining device including at least one heated orifice through which molten glass flows from a glass melter to produce at least one superheated glass stream; and a low-pressure chamber disposed downstream from the heated orifice, where the at least one superheated glass stream flows from the at least one heated orifice and into the low-pressure chamber, and where the low-pressure chamber surrounds the at least one superheated glass stream. In some instances, the low-pressure chamber may include at least one surface extender.

A method for fining molten glass in accordance with one aspect of the disclosure includes melting glass in a glass melter; flowing the molten glass from the glass melter through at least one heated orifice resulting in a superheated glass stream; and flowing the at least one superheated glass stream from the at least one heated orifice and into a low-pressure chamber, where the low-pressure chamber surrounds the at least one superheated glass stream. In some instances, the method may include flowing the at least one superheated glass stream over at least one surface extender.

BRIEF DESCRIPTION OF THE DRAWINGS

The disclosure, together with additional objects, features, advantages and aspects thereof, will be best understood from the following description, the appended claims and the accompanying drawings, in which:

FIG. 8 is a schematic cross-sectional view illustrating a sloped surface extender that may be included in the low-pressure chamber shown in FIG. 7, in accordance with an illustrative embodiment of the present disclosure.

FIG. 9 is a schematic cross-sectional view illustrating a sloped surface extender that may be included in the low-pressure chamber shown in FIG. 7, in accordance with an illustrative embodiment of the present disclosure.

FIG. 10 is a flow diagram showing various steps of an illustrative embodiment of a method for fining glass using the glass fining system and glass fining device including at least one heated orifice and a low-pressure chamber.

DETAILED DESCRIPTION

Figure 2:
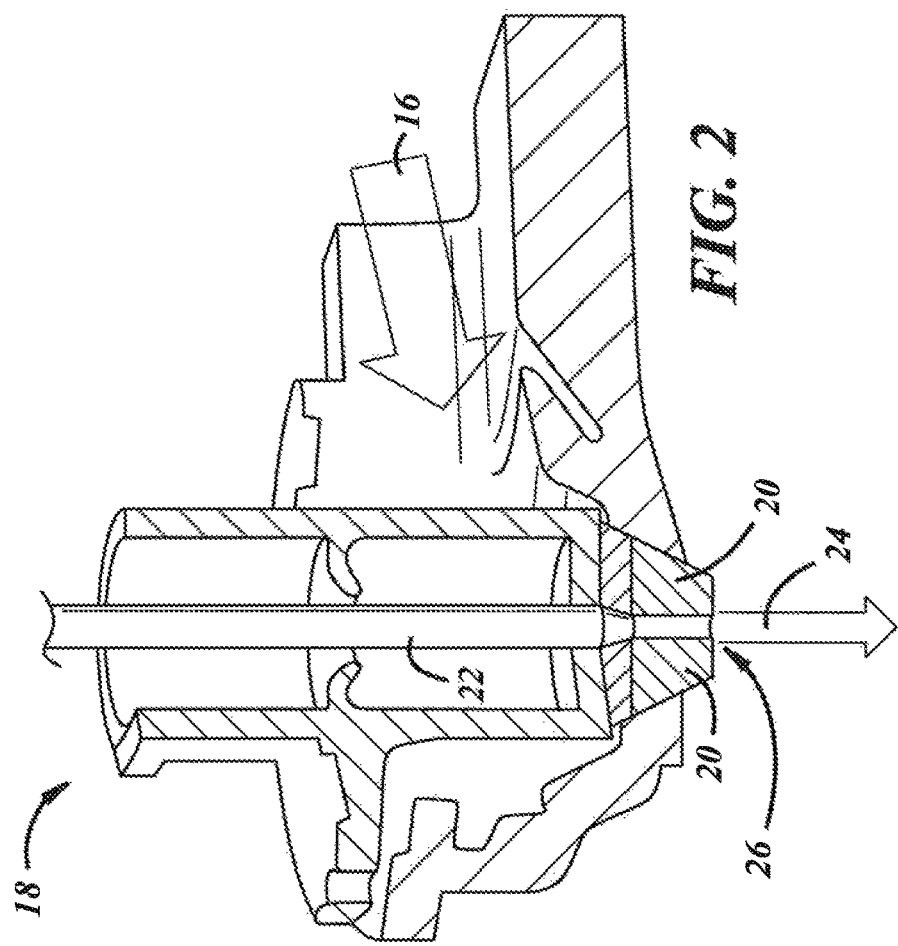
FIG. 2 is a schematic cross-sectional view illustrating a spout and heated orifice of the glass fining device in FIG. 1, in accordance with an illustrative embodiment of the present disclosure.
Figure 1:
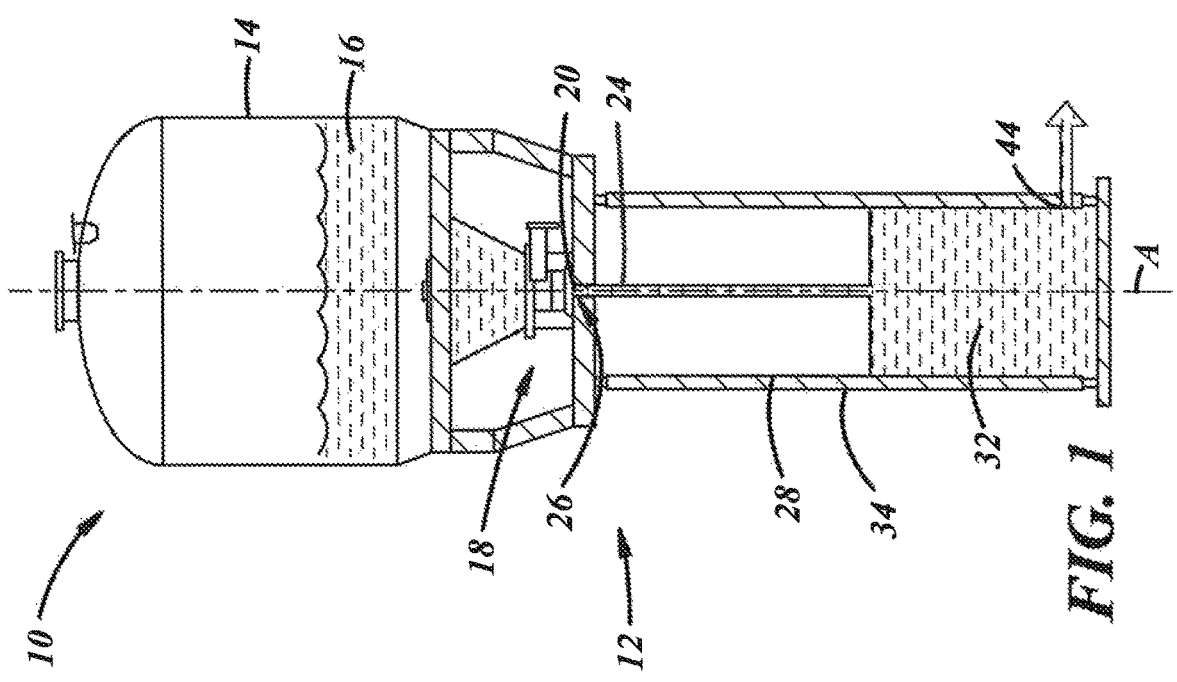
FIG. 1 is a schematic cross-sectional view illustrating a glass fining system and a glass fining device including a heated orifice and a low-pressure chamber for fining molten glass, in accordance with an illustrative embodiment of the present disclosure.

A general object of the present disclosure, in accordance with at least one aspect of the disclosure, is to fine molten glass by removing gas bubbles from the molten glass formed during a melting process, for example in a submerged combustion melter, by using a heated orifice and a low-pressure chamber.

Submerged combustion melting ("SCM") can be an efficient method for melting glass. SCM is based on enhancing heat transfer by mixing combustible fuels and oxidants with raw glass material and firing the fuels and oxidants directly into and under the surface of the glass material to be melted. The contact between the raw glass material and the combusting fuels and oxidants generates a bubbling bath of molten glass along with high rates of mass and heat transfer. However, the bubbling bath of molten glass produces a large amount of gas bubbles in the molten glass. These bubbles are typically removed from the glass melt before the molten glass can be formed into a commercial product (e.g., a glass container) in a process called fining.

One method for removing the gas bubbles from the molten glass is refractory channel thermal fining. However, using thermal fining can take too much time for the bubbles to rise to the surface of the molten glass melt and break. Additionally, refractory channel thermal fining requires an expensive refractory structure, which, during extended operation, can easily wear out, requires high maintenance, and lacks flexibility. Plus, the thermal fining channel occupies a large footprint and valuable manufacturing space. Even further, the thermal fining channel does not have on/off functionality that matches a submerged combustion melter's flexibility.

Consequently, the present disclosure is directed to a system, device, and method that fine molten glass by removing gas bubbles formed during the melting process using at least one heated orifice and a low-pressure chamber. The system, device, and method described herein create a high temperature at a small zone in and around a heated orifice through which molten glass flows resulting in a fine stream of superheated molten glass. The superheated molten glass can have a low viscosity, which allows the gas bubbles to easily migrate from the superheated molten glass. Additionally, the high temperature of the superheated molten glass and low-pressure within the low-pressure chamber create an environment where the glass bubbles in the superheated molten glass grow and become larger. The larger gas bubbles can be easily broken because of both the low viscosity and the low pressure environment of the low-pressure chamber. By using the system, device, and method described herein, the footprint of the fining system is reduced, and the process can be an on/off operation.

Referring generally to FIGS. 1-9 illustrate a glass fining system 10 and a glass fining device 12 in accordance with illustrative embodiments of the present disclosure. Like numerals among the embodiments generally designate like or corresponding elements throughout the several views of the drawing figures. The glass fining system 10 and the glass fining device 12 can be configured to fine molten glass by removing gas bubbles formed during a melting process using a heated orifice and a low-pressure chamber, and, in some instances, at least one surface extender.

As illustrated in FIGS. 1-9, the glass fining system 10 can include the glass fining device 12 and a glass melter 14 that is configured to melt raw glass material and provide molten glass 16 to a downstream heated orifice device 20. The glass melter 14 may be coupled to and/or disposed proximate to the glass fining device 12. The glass melter 14 can include, for example, a submerged combustion melter. During glass melting, the submerged combustion melter fires fuel and oxidants directly into and under the surface of the glass material to be melted and generates a large amount of gas bubbles in the molten glass 16. It will be appreciated that the glass melter 14 may include a variety of types of glass melters other than or in addition to a submerged combustion melter.

Illustrated in FIGS. 1, 3, 4, and 7, the molten glass 16 can exit the glass melter 14 by way of a spout 18 located at a downstream end of the glass melter 14, where the spout 18 can include the at least one heated orifice device 20. The heated orifice device 20 can be used to control flow of and/or provide heat to the molten glass 16. A superheated glass stream 24 results when heat is transferred to the molten glass 16 from the heated orifice device 20.

The heated orifice device 20 may include at least one orifice 26. The orifice 26 can include an opening through which the molten glass 16 can flow and be heated. For example, the spout 18 may include one heated orifice device 20 with five orifices 26a, 26b, 26c, 26d, 26e that can provide five superheated glass streams 24a, 24b, 24c, 24d, 24e. It is contemplated that the spout 18 may include other embodiments with any number of heated orifice devices (e.g., two, three, and so forth) having any number of individual orifices (e.g., one, two, three, and so forth).

The heated orifice device 20 can transfer heat to the molten glass 16 flowing through the heated orifice device 20 to a high enough temperature so that the molten glass 16 decreases in viscosity and/or becomes water-like. The low viscosity can facilitate migration of the gas bubbles from the superheated glass stream 24 more efficiently than the higher-viscosity molten glass 16 in the glass melter 14. For example, the heated orifice device 20 can heat the molten glass 16 to temperatures between 1400° C. and 1700° C. Additionally, the heated orifice device 20 can provide a thin stream of glass, which is easier to heat and fine. At these high temperatures, low viscosity, and thin stream conditions, gas bubbles within the superheated glass stream 24 can more efficiently migrate and escape from the stream. It is contemplated that the heated orifice device 20 may be heated to other temperatures high enough to achieve a low-viscosity superheated glass stream 24.

In a specific embodiment, the heated orifice device 20 can include an electrode orifice. The electrode orifice can be coupled to an electrical supply and/or a controller (not shown) and can be fabricated from material resistant to corrosion from the glass melt. In other embodiments, the heated orifice device 20 may include other means for providing heat, for example a flame burner, an electrical resistance heater, a microwave heater, or any other suitable heater. In some embodiments, the heated orifice device 20 may include an oxidation resistant coating. It will be appreciated that the heated orifice device 20 can comprise a variety of materials and/or configurations. Additionally, the heated orifice device 20 may be capable of being turned on and/or off as determined by an operator.

The glass fining device 12 can include a low-pressure chamber 28 coupled to and/or disposed proximate to the spout 18. The low-pressure chamber 28 can provide a closed space surrounding and configured to receive the at least one superheated glass stream 24 flowing from the spout 18 and the at least one heated orifice device 20, where the superheated glass stream 24 can flow in alignment with and/or in parallel with a vertically inline fining axis A. The low-pressure chamber 28 can provide a pressure (e.g., 20-600 torr) that is lower than the ambient pressure of the environment surrounding the glass fining system 10 and the glass fining device 12. In a specific implementation, the low-pressure chamber 28 can provide a pressure of about 100-200 torr. Additionally, the closed space provided by the low-pressure chamber 28 and/or the sides of the low-pressure chamber 28 may serve to provide insulation to the superheated glass stream 24 to maintain the high temperature of the superheated glass stream 24 and, in turn, maintain the low viscosity and facilitate efficient fining of the superheated glass stream 24. In some embodiments, the low-pressure chamber 28 may include, be coupled to, and/or be in fluid communication with a vacuum device (not shown) for providing vacuum to the low-pressure chamber 28. The low pressure within the low-pressure chamber 28 can increase fining efficiency by increasing the bubble size within the superheated glass stream 24 in combination with low viscosity facilitated by high temperature. In the implementations illustrated in FIGS. 1 and 3, the superheated glass stream 24 can flow from at least one heated orifice device 20 through the low-pressure chamber 28 and directly into a pool 32 of fined glass disposed at a bottom of the low-pressure chamber 28. The pool 32 of fined glass can then flow from an exit 44 of the low-pressure chamber 28 to downstream process steps.

In some instances, the glass fining system 10 and the low-pressure chamber 28 can include at least one surface extender 30. A surface extender 30 can include at least one objective (e.g., a pole, a ball or sphere, a cylinder, a wall, a box, a polyhedron, and the like) and/or any smooth surface or structure disposed in the path of the superheated glass stream 24. The surface extender 30 can comprise a material that is resistant to high temperature and/or corrosion (e.g., a refractory material, niobium, molybdenum, tantalum, tungsten, rhenium). The surface extender 30 can serve to distribute the superheated glass stream 24 into a thin layer on the surface extender 30 to increase residence time within the low-pressure chamber 28. The combined thin layer, low pressure, and increased residence time of the superheated glass stream 24 within the low-pressure chamber 28 combine to facilitate more efficient fining due to a less viscous molten glass stream and larger bubbles. The glass melter 14, the at least one heated orifice device 20, the low-pressure chamber 28, and/or the surface extender(s) 30 may be aligned with the vertically inline fining axis A.

Figure 4:
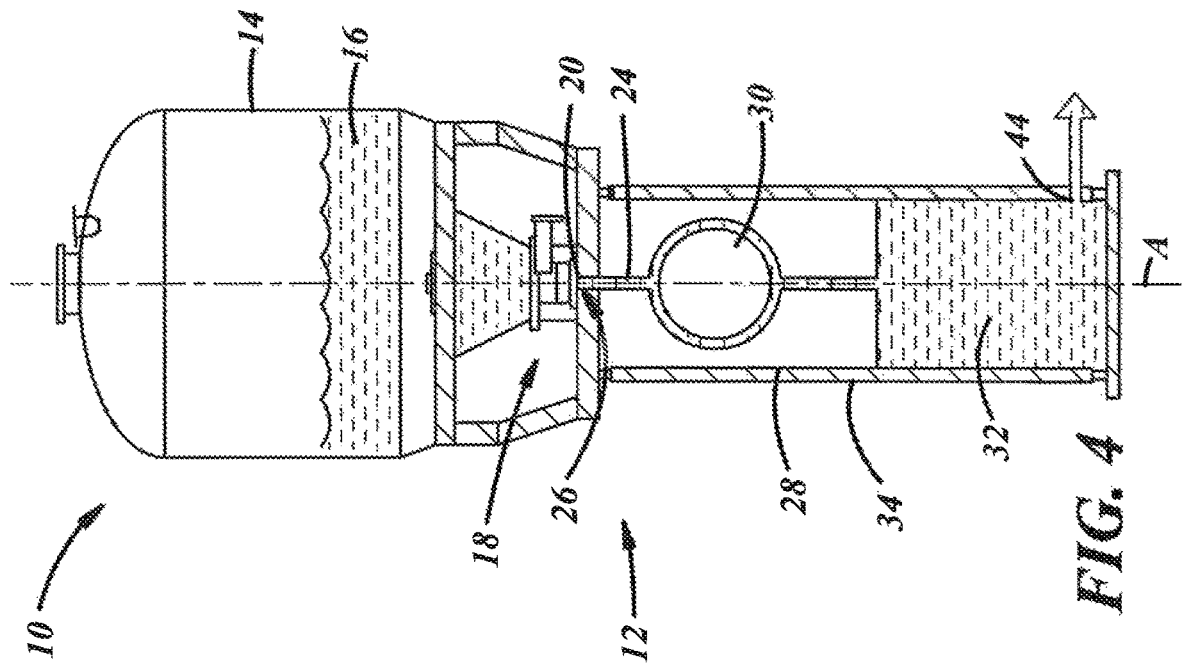
FIG. 4 is a schematic cross-sectional view illustrating a glass fining system and a glass fining device including a superheated glass stream flowing over a surface extender in a low-pressure chamber, in accordance with an illustrative embodiment of the present disclosure.
Figure 3:
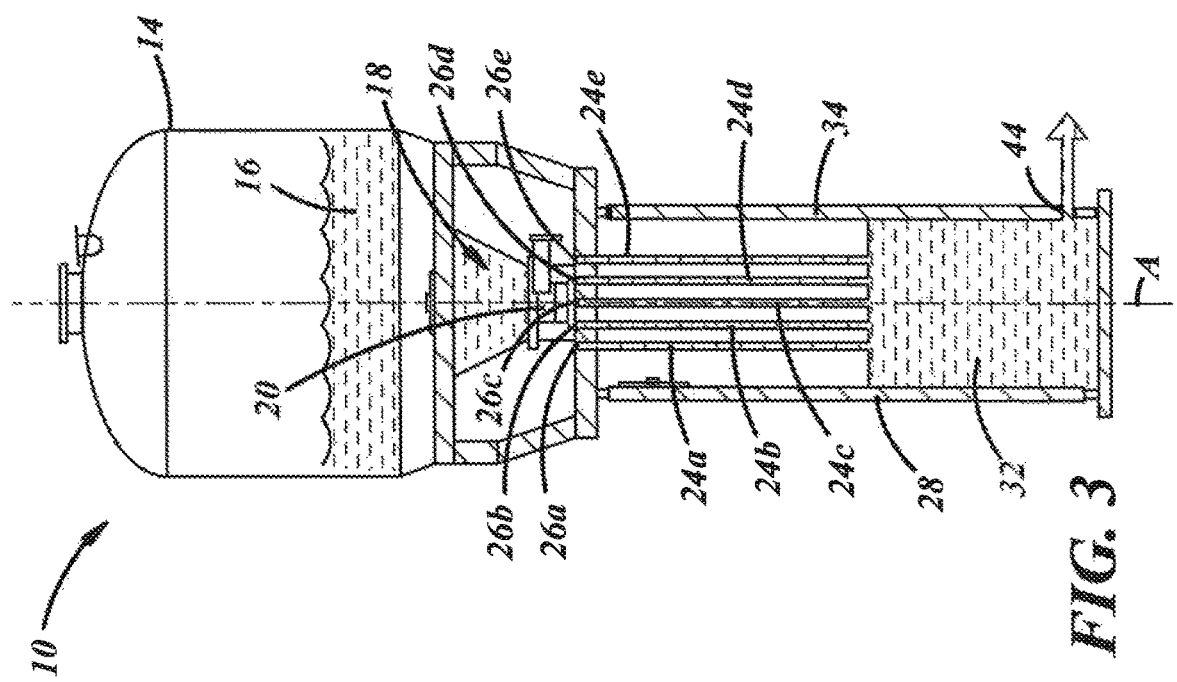
FIG. 3 is a schematic cross-sectional view illustrating a glass fining system and a glass fining device including multiple heated orifices, multiple superheated glass streams, and a low-pressure chamber, in accordance with an illustrative embodiment of the present disclosure.

In the example illustrated in FIG. 4, the low-pressure chamber 28 can include a surface extender 30 comprising a sphere. FIG. 4 illustrates a cross section of the sphere disposed within the low-pressure chamber 28, where the superheated glass stream 24 flows from the heated orifice device 20 and onto and around the sphere. The extra surface area created by the sphere provides a longer flow path for the superheated glass stream 24 and thus increases the residence time of the superheated glass stream 24 within the low-pressure chamber 28. The superheated glass stream 24 can flow by gravity over and from the sphere to the pool 32 of fined glass.

In some embodiments, the surface extender 30 may be temperature controlled using a liquid (e.g., water). In the embodiments illustrated in FIGS. 5 and 6, the surface extender 30 can include at least one heat exchanger line 31 that contains the liquid (e.g., water). The liquid can be heated and/or cooled relative to the surface extender 30 and may be configured to flow and/or circulate through the surface extender 30. In the embodiment shown in FIG. 5, the surface extender 30 can include multiple heat exchanger lines 31 disposed proximate to each other, for example in a coil configuration. In the embodiment shown in FIG. 6, the surface extender 30 can include one heat exchanger line 31 and/or can be filled with a heat exchange fluid. It is contemplated that the surface extender 30 and/or the surface extender 30' may include at least one heat exchanger line 31 and/or other configurations for heating and/or cooling.

In an embodiment, the low-pressure chamber 28 can include a surface extender 30' comprising at least one sloped wall and/or surface. In the example illustrated in FIG. 7, a plurality of sloped walls can extend from a side 34 toward a center of the low-pressure chamber 28 in a sloped configuration (e.g., a 15° slope, a 20° slope, a 45° slope, and so forth). The sloped configuration can facilitate gravitational flow of the superheated glass stream 24 to each sloped wall and to the pool 32 of fined glass below. Additionally, a flow path of the superheated glass stream 24 on the sloped walls may be configured in an alternating or zig-zag fashion, where the superheated glass stream 24 flows from a first wall 36 onto a second wall 38, from the second wall 38 onto a third wall 40, and from the third wall 40 onto a fourth wall 42. The superheated glass stream 24 can then flow from the fourth wall 42 to the pool 32 of fined glass below the plurality of sloped walls. It will be appreciated that the surface extenders 30, 30' may include any number and/or configuration of sloped walls.

In the embodiment shown in FIGS. 8 and 9, the surface extender 30' can be heated, for example, using an electrical heater 33. The electrical heater 33 may include, for example, a resistive heater or an induction heater. FIG. 8 illustrates a surface extender 30' with the electrical heater 33 having a plurality of heating wires that extend within the surface extender 30'. FIG. 9 illustrates the surface extender 30' including the electrical heater 33 in the form of an electrical circuit extending within the surface extender 30'. It will be appreciated that the surface extenders 30, 30' may include other configurations and numbers of surface extender 30 than shown in FIGS. 4 through 9.

In some embodiments, the low-pressure chamber 28 may include combination of types of surface extender 30. For example, the low-pressure chamber 28 can comprise a surface extender 30 including a combination of a sloped wall and a pole, where the superheated glass stream 24 flows from the heated orifice device 20 down a pole, onto a sloped wall, and into the pool 32 of fined glass. It is contemplated that other combinations and configurations of the low-pressure chamber 28, the heated orifice 20, and/or the surface extender(s) 30 may be implemented. In some instances, the low-pressure chamber 28 may not include a surface extender.

In an example, the distance between the spout 18 and the pool 32 in the bottom of the low-pressure chamber 28 can be about 45 inches. Using the embodiments illustrated in FIGS. 1 and 3 and a direct drop of about 45 inches, the low-pressure chamber 28 may provide a residence time of approximately 0.5 seconds for the superheated glass stream 24. Using the embodiments illustrated in FIGS. 4 and 7 including the surface extenders 30 and a direct drop of about 45 inches, the low-pressure chamber 28 may provide a residence time of approximately one to ten minutes for the superheated glass stream 24. The low-pressure chamber 28 and the surface extenders 30 can increase fining efficiency by providing increased residence time and creating a thin glass layer within a low pressure atmosphere.

FIG. 10 illustrates an example of a method 100 for fining molten glass using at least one heated orifice device 20 and a low-pressure chamber 28. For purposes of illustration and clarity, method 100 will be described in the context of the glass fining system 10 and glass fining device 12 described above and illustrated in FIGS. 1 through 9. It will be appreciated, however, that the application of the present methodology is not meant to be limited solely to such an arrangement, but rather method 100 may find application with any number of arrangements (i.e., steps of method 100 may be performed by components of the glass fining system 10 other than those described below, or arrangements of the glass fining system 10 other than that described above).

In an embodiment, method 100 comprises a step 102 of melting glass in a glass melter 14 to produce molten glass 16. In implementations, melting glass in a glass melter 14 can include melting a batch of raw glass material, for example, using a submerged combustion melter. Melting the glass in a submerged combustion melter can include mixing combustible fuels and oxidants with the raw glass material and firing the fuels and oxidants directly into and under the surface of the glass material to be melted. Contact between the raw glass material and the combusting fuels and oxidants generates a bubbling bath of molten glass 16.

Next, method 100 comprises a step 104 of flowing the molten glass 16 from the glass melter 14 and through at least one heated orifice device 20 to provide a superheated glass stream 24. In one implementation, flowing the molten glass 16 may include using a plunger 22 within the spout 18 and/or the glass fining device 12 to cause the molten glass 16 to flow. It is contemplated that other means may be used to flow the molten glass 16. In some instances, flowing the molten glass 16 may include controlling the desired temperature and/or heat transfer rate of the at least one heated orifice device 20 for providing the superheated glass stream 24. In some instances, flowing the molten glass 16 can include flowing the molten glass 16 through a plurality of heated orifice devices 20.

Method 100 includes a step 106 of flowing the superheated glass stream 24 from the at least one heated orifice device 20 into the low-pressure chamber 28. Flowing the superheated glass stream 24 can include using the plunger 22 or other means for causing the superheated glass stream 24 to flow along and/or parallel with the vertically inline fining axis A. The superheated glass stream 24 flowing from the at least one heated orifice device 20 can have a low viscosity and can be water-like because of the heat transferred from the heated orifice device 20. The low viscosity can cause the gas bubbles to migrate from the superheated glass stream 24 as the superheated glass stream 24 flows from the at least one heated orifice device 20. Moreover, flowing the superheated glass stream 24 into and through the low-pressure chamber 28 can facilitate the migration and release of the gas bubbles from the superheated glass stream 24 because the low pressure within the low-pressure chamber 28 causes growing of the gas bubbles in size, thus enabling the gas bubbles to escape from the superheated glass stream 24. In one instance, flowing the superheated glass stream 24 from the at least one heated orifice device 20 can include flowing the superheated glass stream 24 from a heated orifice device 20 so that it falls directly to the pool 32 of fined glass in the bottom of the low-pressure chamber 28.

In other instances, method 100 may include a step 108 of flowing the superheated glass stream 24 over at least one surface extender 30. In embodiments, flowing the superheated glass stream 24 over a surface extender 30 can provide for a longer residence time of the superheated glass stream 24 within the low pressure environment of the low-pressure chamber 28, and, in turn, reduce heat loss and maintain the low viscosity of the superheated glass stream 24, which can continue to facilitate release of the gas bubbles and fining of the superheated glass stream 24. In one example, flowing the superheated glass stream 24 over the surface extender 30 can include flowing the superheated glass stream 24 from the heated orifice device 20 over a sphere, for example the sphere illustrated in FIG. 4. In this example, the superheated glass stream 24 can flow over the surface of the sphere thereby increasing the residence time of the superheated glass stream 24 by the amount of time the molten glass takes to flow over and around the sphere. The superheated glass stream 24 can then flow from the sphere to the pool 32 of fined glass in the low-pressure chamber 28 below the sphere.

Figure 7:
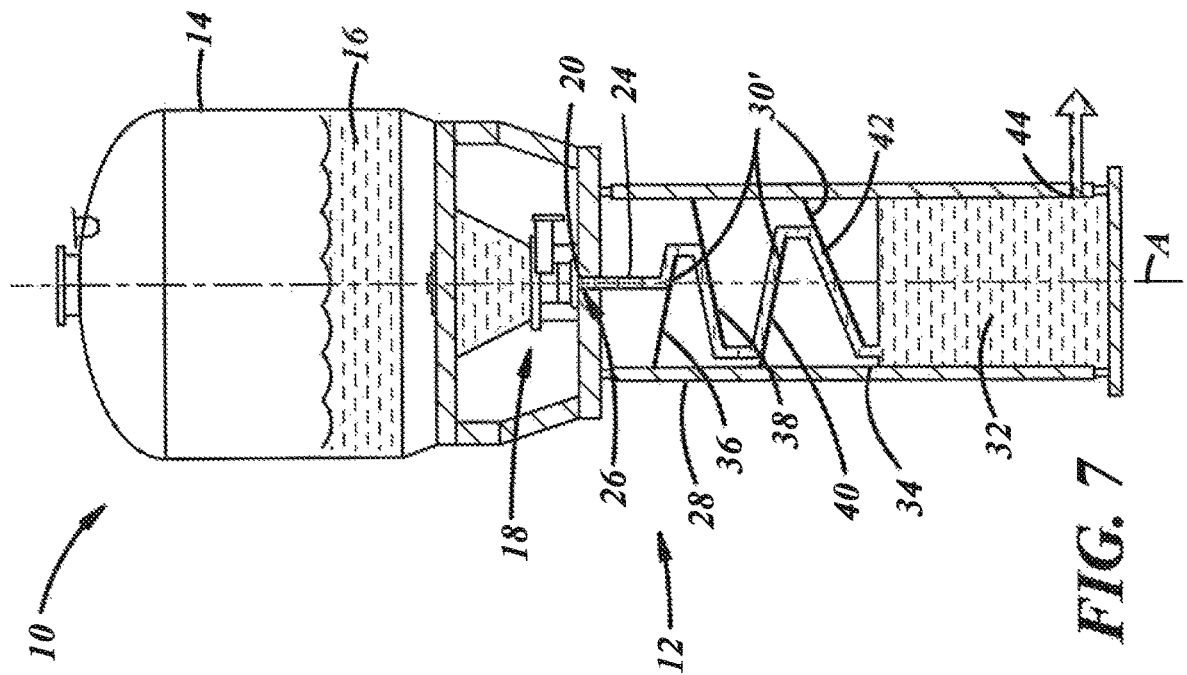
FIG. 7 is a schematic cross-sectional view illustrating a glass fining system and a glass fining device including a superheated glass stream flowing over a surface extender in a low-pressure chamber, in accordance with an illustrative embodiment of the present disclosure.
Figure 5:
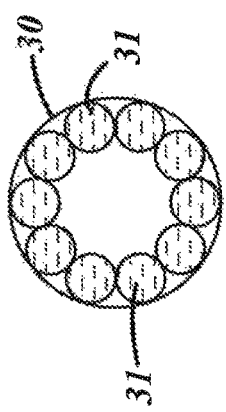
FIG. 5 is a schematic cross-sectional view illustrating a spherical surface extender that may be included in the low-pressure chamber shown in FIG. 4, in accordance with an illustrative embodiment of the present disclosure.
Figure 6:
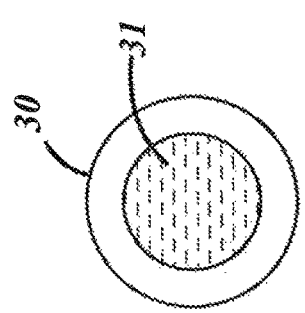
FIG. 6 is a schematic cross-sectional view illustrating a spherical surface extender that may be included in the low-pressure chamber shown in FIG. 4, in accordance with an illustrative embodiment of the present disclosure.

In another example, flowing the superheated glass stream 24 over the surface extender 30 can include flowing the superheated glass stream 24 from the heated orifice device (s) 20 over a surface extender 30 including a plurality of sloping walls, for example the sloping walls illustrated in FIG. 7. In this example, the superheated glass stream 24 can flow onto a first sloped wall 36, and from the first sloped wall 36 to a second sloped wall 38 and so forth, thereby increasing the residence time of the molten glass within the low-pressure chamber 28 by the amount of time the superheated glass stream 24 takes to flow down the sloped walls. The superheated glass stream 24 can then flow from the last sloped wall and down into a pool 32 of fined molten glass in the bottom of the low-pressure chamber 28 below the sloped walls. In other examples, flowing the superheated glass stream 24 may include flowing the molten glass over at least one surface extender 30 including, for example, a pole or rod, a sloped mesh wall, a cylinder, or other-shaped object.

There thus has been disclosed a glass fining system and glass fining device using at least one heated orifice and a low-pressure chamber that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments for expedience. The disclosure is intended to embrace all such modifications and variations as fall within the spirit and broad scope of the appended claims.

The invention claimed is:

1. A glass fining device, comprising:
at least one heated orifice device including at least one orifice through which molten glass flows directly from a glass melter through the at least one heated orifice device, said at least one heated orifice device capable of heating said molten glass to a superheated temperature above that of a temperature of the molten glass to produce at least one superheated glass stream;
a low-pressure chamber disposed downstream from and connected directly to the at least one heated orifice device, where the at least one superheated glass stream flows directly from the at least one heated orifice device and into the low-pressure chamber, and where the low-pressure chamber surrounds the at least one superheated glass stream and is at a pressure less than atmospheric pressure, said low-pressure chamber insulated to maintain said at least one superheated glass stream at said superheated temperature; and
said low-pressure chamber providing a residence time of said at least one superheated glass stream in said low-pressure chamber of from 1 minute to 10 minutes.

2. The glass fining device in claim 1, wherein the at least one heated orifice device includes a plurality of orifices.

3. The glass fining device in claim 1, wherein the at least one heated orifice device includes an electrode orifice.

4. The glass fining device in claim 1, wherein the at least one heated orifice device heats the molten glass to a superheated temperature of between 1400° C. and 1700° C.

5. The glass fining device in claim 1, wherein the at least one heated orifice device and the low-pressure chamber are aligned with a vertically inline fining axis.

6. The glass fining device in claim 1, wherein the low-pressure chamber is at a pressure of from 20-600 torr.

7. The glass fining device in claim 1, wherein the low-pressure chamber includes at least one surface extender.

8. The glass fining device in claim 7, wherein the at least one surface extender is an induction heat surface extender.

9. The glass fining device in claim 7, wherein the at least one surface extender is a water cooled surface extender.

10. The glass fining device in claim 7, wherein the at least one surface extender includes at least one of a pole, a sphere, or a sloped wall.

11. A glass fining system, comprising:
a glass melter; and
a glass fining device directly coupled to the glass melter, including
at least one heated orifice device through which molten glass from said glass melter flows, said at least one heated orifice device producing at least one superheated glass stream flows from the glass melter, said superheated glass stream having a superheated temperature above a temperature of the molten glass;
a low-pressure chamber disposed downstream from and directly connected to the at least one heated orifice device, where the at least one superheated glass stream flows directly from the at least one heated orifice device and into the low-pressure chamber, and where the low-pressure chamber surrounds the at least one superheated glass stream and is at a pressure less than atmospheric pressure, said low-pressure chamber insulated to maintain said at least one superheated glass stream at said superheated temperature; and said low-pressure chamber providing a residence time of said at least one superheated glass stream of from 1 minute to 10 minutes.

12. The glass fining system in claim 11, wherein the glass melter includes a submerged combustion melter.

13. A method for fining molten glass, comprising:
melting glass in a glass melter;
flowing the molten glass having a molten glass temperature from the glass melter directly through at least one heated orifice device, the at least one heated orifice device heating the molten glass resulting in a superheated glass stream having a superheated temperature above the molten glass temperature; and
flowing the at least one superheated glass stream from the at least one heated orifice device directly into a low-pressure chamber, wherein the low-pressure chamber surrounds the at least one superheated glass stream, is at a pressure less than atmospheric pressure, is insulated to maintain the superheated glass stream at the superheat temperature and provides a residence time for the superheated glass stream of from 1 minute to 10 minutes.

14. The method for fining molten glass in claim 13, wherein the glass melter is a submerged combustion melter.

15. The method for fining molten glass in claim 13, wherein the at least one heated orifice device is an electrode orifice.

16. The method for fining molten glass in claim 13, wherein the at least one heated orifice device heats the molten glass to a superheated temperature of between 1400° C. and 1700° C.

17. The glass fining device in claim 13, wherein the low-pressure chamber is at a pressure of from 20-600 torr.

18. The method for fining molten glass in claim 13, wherein flowing the superheated glass stream includes flowing the superheated glass stream parallel to a vertically inline fining axis.

19. The method for fining molten glass in claim 13, further comprising:
flowing the at least one superheated glass stream over at least one surface extender.

20. The method for fining molten glass in claim 19, wherein the at least one surface extender includes an induction heat surface extender.

21. The method for fining molten glass in claim 19, wherein the at least one surface extender includes a water cooled surface extender.

22. The method for fining molten glass in claim 19, wherein the at least one surface extender includes at least one of a pole, a sphere, or a sloped wall.

* * * * *